United States Patent [19]
Aulph et al.

[11] Patent Number: 6,138,859
[45] Date of Patent: Oct. 31, 2000

[54] FUEL TANK ASSEMBLY

[75] Inventors: Steven F. Aulph, Flint, Mich.; Steven G. Kensinger, Burnsville, Minn.

[73] Assignee: Delphi Technologies, Inc., Troy, Mich.

[21] Appl. No.: 09/425,569

[22] Filed: Oct. 20, 1999

Related U.S. Application Data

[60] Provisional application No. 60/138,252, Jun. 8, 1999.

[51] Int. Cl.⁷ .................................. B60P 3/00; F17B 1/14
[52] U.S. Cl. .......................... 220/563; 137/574; 137/576; 220/4.14
[58] Field of Search ................................. 220/563, 4.14; 137/574; 2/576

[56] References Cited

U.S. PATENT DOCUMENTS

| | | | |
|---|---|---|---|
| 3,912,107 | 10/1975 | Baumann | 220/563 |
| 4,179,036 | 12/1979 | Pasini | 220/563 |
| 4,611,724 | 9/1986 | Watkins et al. | 220/563 |
| 4,844,278 | 7/1989 | Freiwald et al. | 220/563 |
| 5,031,795 | 7/1991 | Kotgra et al. | 220/563 |
| 5,779,092 | 7/1998 | Hehn et al. | 220/563 |
| 5,960,981 | 10/1999 | Dodson et al. | 220/563 |

*Primary Examiner*—Joseph M. Moy
*Attorney, Agent, or Firm*—Vincent A. Cichosz

[57] ABSTRACT

A fuel tank assembly for a vehicle includes a tank shell having a first half shell and a second half shell. The fuel tank assembly also includes a plurality of column supports disposed between and attached to the first half shell and the second half shell. The fuel tank assembly further includes a cradle baffle disposed between the first half shell and the second half shell and attached to the column supports. The cradle baffle has at least one compliant joint disposed between a pair of the column supports to allow the cradle baffle to distort when a force is applied to the tank shell.

20 Claims, 2 Drawing Sheets

FUEL TANK ASSEMBLY

CROSS-REFERENCE TO RELATED APPLICATION(S)

The present invention claims the priority date of copending United States Provisional Patent Application Ser. No. 60/138,252, filed Jun. 8, 1999.

TECHNICAL FIELD

The present invention relates generally to fuel tanks for vehicles and, more particularly, to a fuel tank assembly for a vehicle.

BACKGROUND OF THE INVENTION

It is known to provide a fuel tank such as a metal or plastic fuel tank in a vehicle to hold fuel to be used by an engine of the vehicle. In some vehicles, the fuel tanks have a shell made from a first half shell and a second half shell that are joined together. Currently, fuel tanks utilize baffles inside the tank to stiffen the tank shell for controlling the amount of shell movement (volume change in tank), and/or as an obstruction to minimize sloshing of the fuel, during operation of the vehicle. Baffles may be used in either metal or plastic fuel tanks. A baffle is usually a sheet of the same material as the tank that, most often, is mounted inside the tank at or near ninety (90) degrees to the tank wall. The baffle may be attached to the shell along edges, at strategic points within the tank or fit in grooves.

During manufacture of the fuel tank, the baffle may be attached to the tank shell when the relative temperatures between the tank shell and baffle are significantly different, causing, after cooling to a common temperature, stress due to different amounts of shrinkage. Additionally, when a fuel tank containing a baffle is subjected to a force significant enough to cause the tank shell to deflect inward at or near a baffle edge, the baffle may penetrate the shell, resulting in failure of the tank. Such failures result from the baffle behaving as a rigid structure that does not stretch, buckle, or deflect in a fashion similar to the tank shell.

Although the fuel tank has worked, it is desirable to provide a fuel tank assembly for a vehicle that incorporates a baffle that is different from existing baffles and offers compliance to shrinking of the tank shell during manufacture. It is also desirable to provide a fuel tank assembly for a vehicle that incorporates a baffle that can offer directional properties (e.g., stiffness) to suit the function of each tank configuration. It is further desirable to provide a fuel tank assembly for a vehicle that incorporates a baffle that offers compliance to excessive forces that may be applied to the tank during operation.

SUMMARY OF THE INVENTION

It is, therefore, one object of the present invention to provide a new fuel tank assembly for a vehicle.

It is another object of the present invention to provide a fuel tank assembly for a vehicle that incorporates a new baffle.

It is yet another object of the present invention to provide a fuel tank assembly for a vehicle that incorporates a compliant baffle.

To achieve the foregoing objects, the present invention is a fuel tank assembly for a vehicle including a tank shell having a first half shell and a second half shell. The fuel tank assembly also includes a plurality of column supports disposed between and attached to the first half shell and the second half shell. The fuel tank assembly further includes a cradle baffle disposed between the first half shell and the second half shell and attached to the column supports. The cradle baffle has at least one compliant joint disposed between a pair of the column supports to allow the cradle baffle to distort when a force is applied to the tank shell.

One advantage of the present invention is that a fuel tank assembly is provided for a vehicle that incorporates a new baffle. Another advantage of the present invention is that the fuel tank assembly incorporates a baffle that offers compliance to shrinking of the tank shell during manufacture and to excessive forces that may be applied to the fuel tank during operation. Yet another advantage of the present invention is that the fuel tank assembly has a baffle incorporating a compliant joint can be directional to suit the function of each tank configuration. Still another advantage of the present invention is that the fuel tank assembly has a baffle that is directional in nature that allows the design to be applied so that the baffle does not offer significant stiffness in directions where structural stiffness is not needed for fuel tank performance.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
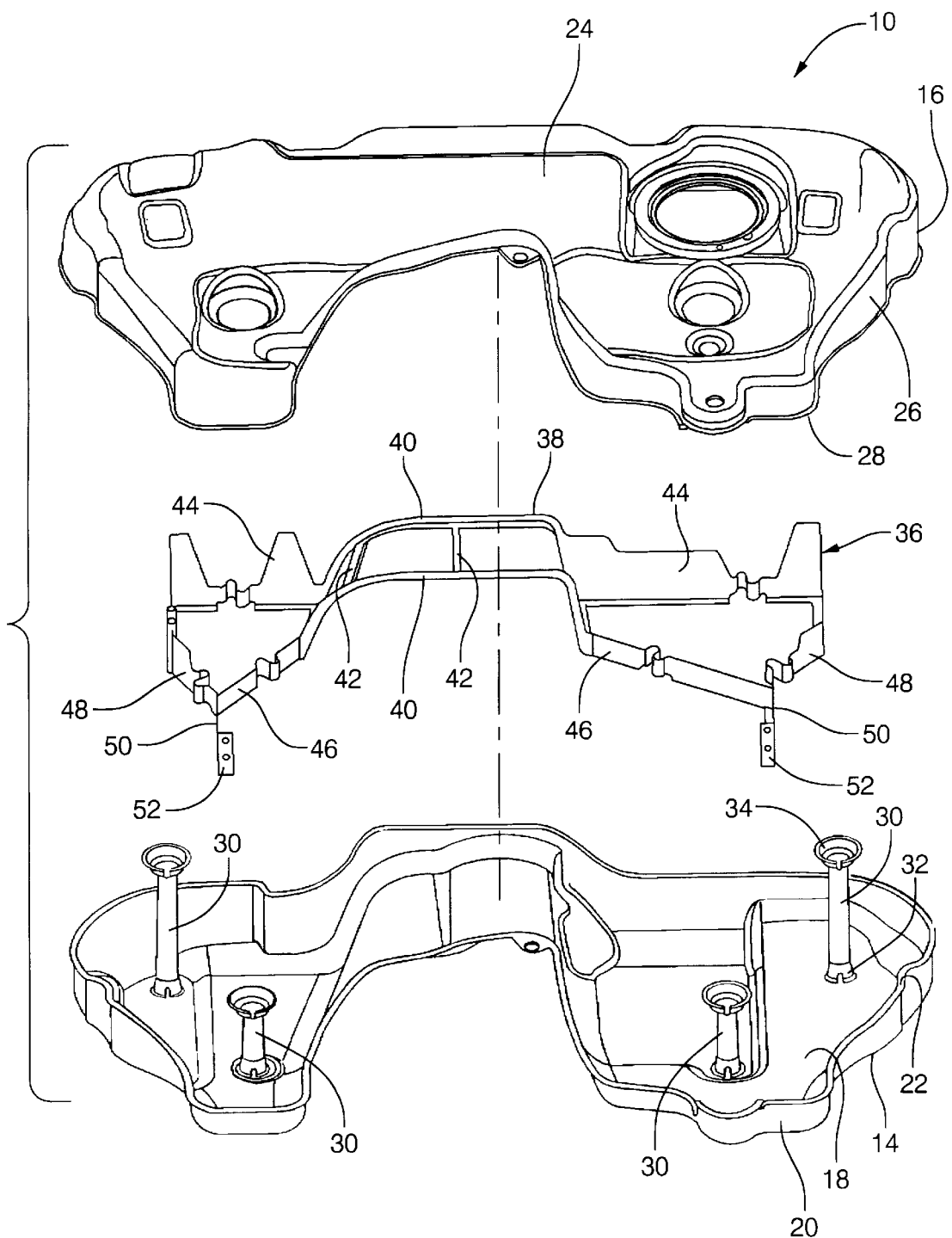
FIG. 1 is an exploded perspective view of a fuel tank assembly, according to the present invention.
Figure 2:
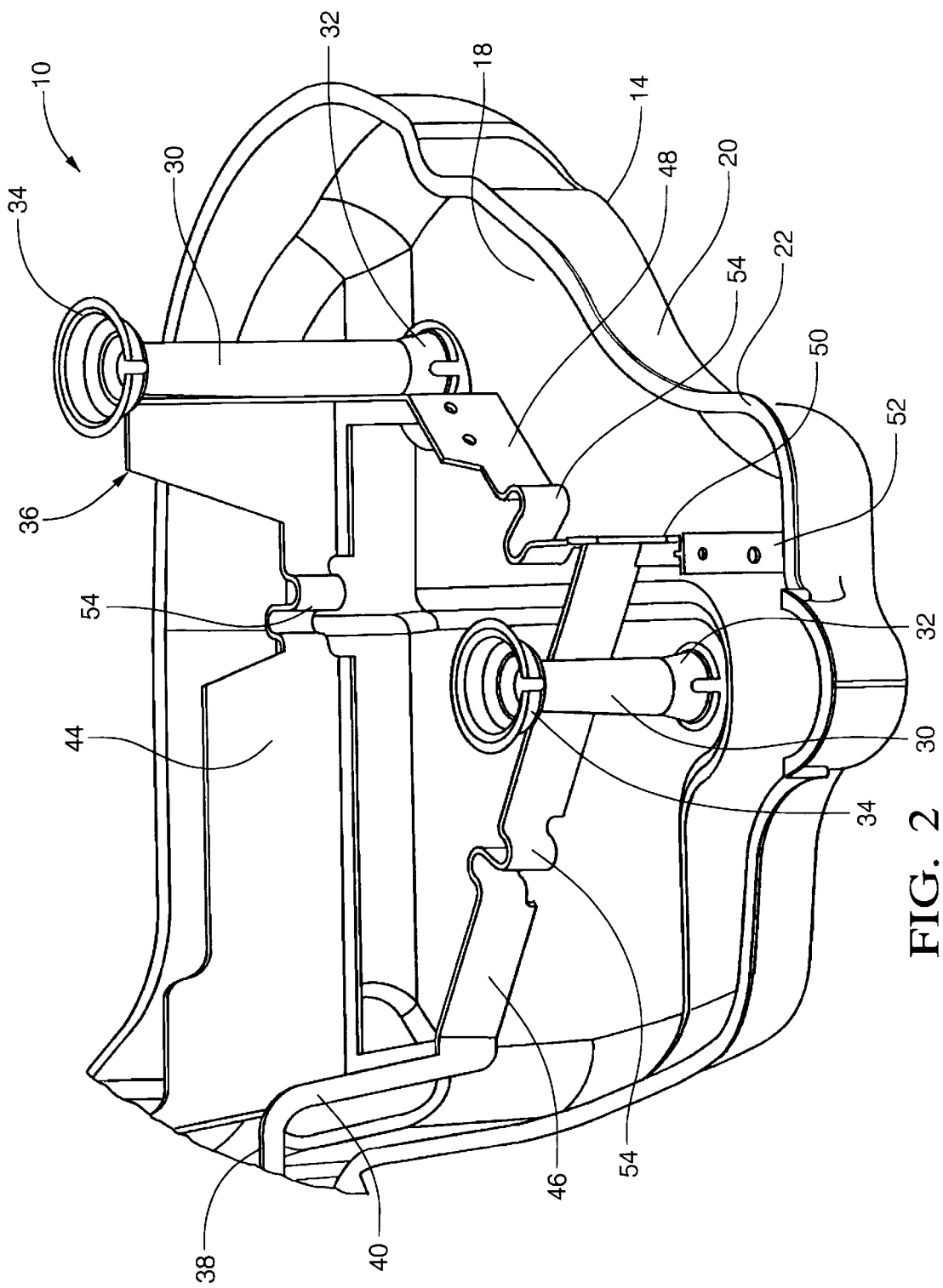
FIG. 2 is a perspective view of a portion of the fuel tank assembly of FIG. 1 with an upper half shell removed.

Referring to the drawings and in particular FIGS. 1 and 2, one embodiment of a fuel tank assembly 10, according to the present invention, is shown for a vehicle (not shown). The fuel tank assembly 10 includes a tank shell 12. In this embodiment, the tank shell 12 is of a saddle type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together by suitable means such as by welding. The lower half shell 14 and upper half shell 16 are made of a rigid material such as plastic. It should be appreciated that the tank shell 12 is conventional and known in the art.

The fuel tank assembly 10 also includes at least one, preferably a plurality of column supports 30 disposed between the lower half shell 14 and upper half shell 16. The column supports 30 are generally tubular in shape with a generally circular cross-section. The column supports 30 are made of a plastic material, preferably the same material as the tank shell 12. The column supports 30 have a first end 32 extending radially outwardly for attachment to the lower half shell 14 and a second end 34 extending radially outwardly for attachment to the upper half shell 16. As illustrated, the first ends 32 of the column supports 30 are attached to the lower half shell 14. It should be appreciated that the second ends 34 of the column supports 30 are attached to the upper half shell 16.

The fuel tank assembly 10 also includes a cradle baffle, generally indicated at 36, disposed between the lower half shell 14 and upper half shell 16. The cradle baffle 36 includes a cradle span 38 extending laterally. The cradle span 38 has a pair of first members 40 extending laterally and a plurality of second members 42 extending generally perpendicular to and interconnecting the first members 40. The cradle baffle 36 includes at least one, preferably a plurality of baffle sections 44,46,48 extending between each end of the cradle span 38 and the column supports 30. For example, the cradle baffle 36 has a first baffle section 44 extending laterally from one of the first members 40 to one of the column supports 30 and a second baffle section 46 extending laterally on the same side from the other one of the first members 40 to another one of the column supports 30. The cradle baffle 36 has a third baffle section 48 extending between the first baffle section 44 and second baffle section 46. The cradle baffle 36 includes an extension 50 extending from the intersection of the second baffle section 46 and third baffle section 48 and having a flange/support 52 to hold a part, such as a valve-tank pressure control) in a proper location in the tank shell 12. The baffle sections 44,46,48 may be secured to the column supports 30 by suitable means such as welding. The cradle baffle 36 is made of a rigid material, preferably the same material as the tank shell 12. The cradle baffle 36 resists sloshing of fuel in the tank shell 12 and supports internal tank components. It should be appreciated that the tank components such as pumps, fuel lines, senders and other components that normally attach to the cradle baffle 36 are not shown. It should also be appreciated that the length of the baffle sections 44,46,48 may be varied. It should further be appreciated that only the column supports 30 are structurally attached to the base walls 18 and 24 of the tank shell 12.

Each baffle section 44,46,48 includes a compliant joint 54 disposed between the ends thereof. The compliant joint 54 has a geometry of a predetermined shape such as a generally "S" shape cross-section similar to a mathematical sine function. The geometry of the compliant joint 54 can be varied to accommodate different tank shells and operational behaviors. For example, the compliant joint 54 may have a geometry of "S", "Z", "U", "W", "V", "O", "M", "C", "L" or the like. The compliant joint 54 can be optimized by controlling the depth, thickness, height, length, radii of shape and location of the compliant joint 54 in the baffle section 44,46,48. The compliant joint 54 and baffle sections 44,46,48 are integral, unitary and formed as one-piece. It should be appreciated that the cradle baffle 36 and compliant joints 54 control the stiffness contributed to the tank shell 12 by the baffle sections 44,46,48 to minimize stresses introduced to the tank shell 12 during manufacturing and operation of the fuel tank assembly 10. It should also be appreciated that the cradle baffle 36 is a monolithic structure being integral, unitary and one-piece.

When manufacturing the fuel tank assembly 10, the cradle baffle 36 is inserted at a significantly lower temperature inside the heated lower half shell 14, which is near the melt point of the plastic. The upper half shell 16 is lowered onto the lower half shell 14 and the flanges 22 and 28 are welded together, sealing an interface, and forming the fuel tank assembly 10. During the joining operation, the column supports 30 are also welded to the base walls 18 and 24 of the lower and upper half shells 14 and 16. When cooling, the lower and upper half shells 14 and 16 shrink more than the cradle baffle 36. As this shrinkage occurs, the compliant joints 54 will flex, changing the shape of the compliant joint 54, with minimum force. This allows the baffle sections 44,46,48 to follow the shrinkage of the tank shell 12 without offering significant resistance force or stress in the column supports 30 or welds of the column supports 30 to the tank shell 12.

In operation of the fuel tank assembly 10, significant forces may be applied to the side walls 20 and 26 and base walls 18 and 24 of the fuel tank assembly 10 to cause the tank shell 12 to deflect into the interior of the tank shell 12 and contact an edge of the baffle sections 44,46,48. During this applied force, the compliant joints 54 will flex or bend, allowing the cradle baffle 36 to move ahead of the intruding tank shell 12. This flexing or bending allows the tank shell 12 and cradle baffle 36 to distort together, minimizing the possibility of the cradle baffle 36 rupturing the tank shell 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank assembly for a vehicle comprising:
   a tank shell having a first half shell and a second half shell;
   a plurality of column supports disposed between and attached to said first half shell and said second half shell;
   a cradle baffle disposed between said first half shell and said second half shell and attached to said column supports; and
   said cradle baffle having at least one compliant joint disposed between a pair of said column supports to allow said cradle baffle to distort when a force is applied to said tank shell.

2. A fuel tank assembly as set forth in claim 1 wherein said cradle baffle has a cradle saddle and at least one baffle section extending from said cradle section, said compliant joint being formed in said baffle section.

3. A fuel tank assembly as set forth in claim 1 wherein said compliant joint has a geometry of a generally S shaped cross-section.

4. A fuel tank assembly as set forth in claim 1 wherein said at least one compliant joint has a geometry of one of a group of S, Z, U, W, V, O, M, C and L.

5. A fuel tank assembly as set forth in claim 2 wherein said at least one baffle section and said at least one compliant joint are integral, unitary and one-piece.

6. A fuel tank assembly as set forth in claim 1 wherein said column supports are generally tubular in shape.

7. A fuel tank assembly as set forth in claim 1 wherein said tank shell is made of a plastic material.

8. A fuel tank assembly as set forth in claim 1 wherein said cradle baffle is made of a plastic material.

9. A fuel tank assembly as set forth in claim 2 wherein said at least one compliant joint is located between ends of said at least one baffle section.

10. A fuel tank assembly as set forth in claim 1 wherein said first half shell and said second half shell each have a base wall and a side wall, said cradle baffle abutting said side wall.

11. A fuel tank assembly as set forth in claim 1 wherein said cradle baffle is a monolithic structure formed from the same material as said tank shell.

12. A fuel tank assembly for a vehicle comprising:

a tank shell having a first half shell and a second half shell;

a plurality of column supports disposed between and attached to said first half shell and said second half shell;

a cradle baffle disposed between said first half shell and said second half shell and attached to said column supports; and said cradle baffle having plurality of baffle sections extending between said column supports, each of said baffle sections having at least one compliant joint.

13. A fuel tank assembly as set forth in claim 12 wherein said cradle baffle has a cradle saddle and said baffle sections extending from said cradle section.

14. A fuel tank assembly as set forth in claim 12 wherein said at least one compliant joint has a geometry of one of a group of S, Z, U, W, V, O, M, C and L.

15. A fuel tank assembly as set forth in claim 12 wherein said baffle sections and said compliant joints are integral, unitary and one-piece.

16. A fuel tank assembly as set forth in claim 12 wherein said column supports are generally tubular in shape.

17. A fuel tank assembly as set forth in claim 12 wherein said tank shell is made of a plastic material.

18. A fuel tank assembly as set forth in claim 12 wherein said cradle baffle is made of a plastic material.

19. A fuel tank assembly as set forth in claim 12 wherein said compliant joints are located between ends of said baffle sections.

20. A fuel tank assembly for a vehicle comprising:

a tank shell having a first half shell and a second half shell;

a plurality of column supports disposed between and attached to said first half shell and said second half shell;

a cradle baffle disposed between said first half shell and said second half shell and attached to said column supports; and said cradle baffle having a saddle and a plurality of baffle sections extending between said saddle and said column supports, each of said baffle sections having at least one compliant joint with a geometry of one of a group of S, Z, U, W, V, O, M, C and L.

* * * * *